(12) United States Patent
Lipson et al.

(10) Patent No.: US 7,072,538 B1
(45) Date of Patent: Jul. 4, 2006

(54) PLANAR RECONFIGURABLE OPTICAL ADD/DROP MODULE

(75) Inventors: Jan Lipson, Cupertino, CA (US); Steven Wang, San Jose, CA (US); Mina Farr, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 159 days.

(21) Appl. No.: 10/361,358

(22) Filed: Feb. 10, 2003

Related U.S. Application Data

(60) Provisional application No. 60/426,115, filed on Nov. 13, 2002.

(51) Int. Cl.
*G02B 6/26* (2006.01)
*G02B 6/42* (2006.01)
*G02B 5/32* (2006.01)
*H04J 14/02* (2006.01)
*G03H 1/00* (2006.01)

(52) U.S. Cl. .......................... 385/17; 398/85; 398/83; 359/1; 359/15; 359/34

(58) Field of Classification Search .................. 385/17, 385/37; 359/1–34; 398/82–85
See application file for complete search history.

(56) References Cited

U.S. PATENT DOCUMENTS

| 4,753,505 A | 6/1988 | Mikami et al. |
| 6,002,823 A | 12/1999 | Chandross et al. |
| 6,356,679 B1 * | 3/2002 | Kapany ........................ 385/18 |
| 6,445,845 B1 * | 9/2002 | Sakata et al. .................. 385/18 |
| 6,584,244 B1 * | 6/2003 | Hung ........................... 385/24 |
| 2003/0175007 A1 * | 9/2003 | Wildeman et al. ........... 385/147 |

FOREIGN PATENT DOCUMENTS

| DE | 32 22 508 A1 | 1/1985 |
| EP | 0 367 682 | 5/1990 |
| WO | WO 97/22907 | 6/1997 |

OTHER PUBLICATIONS

Thylen, L., "Integrated Optics in LiNbO$_3$: Recent Developments in Devices for Telecommunications" pp. 2,6,7, 21,22, 24-27, vol. 6, No. 6, Jun. 1, 1988.

Sakuma, Ken; Ogawa, Hirokuni; Fujita, Daigo; Hosoya, Hideyuki, "Polymer Y-Branching Thermo-Optics Switch For Optical Fiber Communications Systems" Optical Communications Technology Department, Oct. 24, 2001.

* cited by examiner

*Primary Examiner*—Brian Healy
*Assistant Examiner*—Charlie Peng
(74) *Attorney, Agent, or Firm*—Wirkman Nydegger

(57) ABSTRACT

A reconfigurable optical add/drop module (ROADM) for dynamically adding or dropping various wavelengths of an optical signal without having to physically replace the module with a wavelength-specific add/drop module, and corresponding methods. A multiplexed optical signal in an optical network enters the reconfigurable optical add/drop module. Filters on the module separate various wavelengths of the optical signal along the module's various waveguides and a reconfigurable switching matrix directs the various wavelengths of the optical signal to be added, dropped and/or combined with other wavelengths.

23 Claims, 8 Drawing Sheets

PLANAR RECONFIGURABLE OPTICAL ADD/DROP MODULE

CROSS-REFERENCE TO RELATED APPLICATIONS

This application claims the benefit of U.S. Provisional Patent Application Ser. No. 60/426,115, entitled "Optical Add/Drop Module," filed Nov. 13, 2002, which is incorporated herein by reference.

BACKGROUND OF THE INVENTION

1. The Field of the Invention

The present invention relates generally to optical communication. More particularly, the present invention relates to modules for dynamically adding or dropping portions of an optical signal.

2. The Relevant Technology

Networks increasingly employ fiber optic technology to transmit information reliably via a communications network. Networks that employ fiber optic technology are known as optical communications networks, and are marked by high bandwidth and reliable, high-speed data transmission.

Optical communications networks often employ a technique known as wavelength division multiplexing (WDM) in order to maximize the amount of information that can be transmitted via the network. To employ this technology, a plurality of optical transmitters, located at the transmission nodes of the optical network, transmit optical signals. Each optical transmitter receives an electrical signal from a network device, such as a computer, and modulates the electrical signal via a laser to an optical signal having a distinct wavelength, called a channel. The distinct channels from the optical transmitters are then combined by a multiplexor to form a multiplexed optical signal. The multiplexed optical signal can then be transmitted via a single fiber optic cable to an optical network, such as a LAN backbone. A reception node of the network then receives the multiplexed, optical signal.

Once received by the reception node, the multiplexed optical signal is divided back into its constituent channels by a demultiplexor, and each channel is fed to one of a plurality of optical receivers for modulation into electrical signals. The electrical signals are then forwarded to a network device, such as a computer, for processing.

Not every channel, however, may be needed at a given time, and components on an optical network may need to communicate with each other through only one channel of a multiplexed optical signal. Alternatively, components simply may require fewer channels than are present in the multiplexed signal. As such, components may use add/drop modules to manage each of the different wavelength channels in an optical signal. As the name implies, add/drop modules are for adding or dropping component channels of an optical signal.

Add/drop modules are used frequently at nodes, or connection points, to manage exchanges of data channel signals in an optical network. Particularly, an add/drop module may drop an unused channel of a multiplexed signal while simultaneously adding a different, appropriate channel. Add/drop modules may interface directly with a computer to communicate Ethernet data from a fiber-optic network, in which case the add/drop modules are used to extract the channel of interest from the multiplexed optical signal. Add/drop modules also may be employed in transceivers or some other nodes in a fiber optic network.

More specifically, add/drop modules extract from the multiplexed signal those channels that are to be used by a device in the network. This enables components on a network, such as two computers, to communicate over the same wavelength, or channel, of a fiber optic signal, without necessarily interrupting bandwidth dedicated to the other channels in the signal. For similar reasons, the add/drop module also can be used to insert the dropped channel back into the optical signal, or to include different data that is encoded on the same wavelength as the dropped channel. One problem with conventional add/drop modules, however, is that they tend to be fixed, operating only on specific channels or wavelengths, and they generally cannot add or drop other channels without being replaced by a different add/drop module corresponding to the newly desired channels.

In addition to add/drop modules, optical networks also may employ various types of optical switches for switching and routing optical signals. One type of optical switch includes a matrix of thermo-optic switching elements interconnected by waveguides formed on a silica substrate. Other types of switches, known as planar optical switches, are available for some applications. Planar switches, such as switched directional couplers, represent an example of $LiNbO_3$-based switches. In addition to traditional signal switching and routing, optical switching applications also may require selective optical signal filtering.

Although fixed wavelength add/drop devices are known in the art, there exists a need for add/drop devices that are configurable for use with a variety of wavelengths. Accordingly, a need exists for an optical add/drop module capable of wide-band WDM optical signal transmission and filtration. The optical add/drop module should be capable of dropping and adding a variety of channels without having to be physically replaced.

BRIEF SUMMARY OF THE INVENTION

The present invention relates to a reconfigurable optical add/drop module (ROADM). The module includes waveguides that direct specific channels of a WDM optical signal. For example, the waveguides receive optical signals from input ports and guide the optical signal and/or channels of the optical signal through the module, ultimately to output ports.

A filter portion of the module includes a set of discrete focusing filters that direct or reflect one or more wavelengths, or channels, of the optical signal. The filters are arrayed on the substrate in such as way as to direct certain channels differentially. For example, this array enables the filters to direct a given channel by a given displacement. Accordingly, the filters direct specific channels to particular waveguides on the substrate.

One of the waveguides may be associated with a drop channel, such that the channel corresponding to that waveguide will be dropped from the optical signal. The remaining channels, i.e., wavelengths not dropped, are recombined in one or more of the waveguides, and thereafter guided out of the module through an output port.

The module is reconfigurable in that any of the channels can be selected for the add/drop operation. This is done using a switching matrix that switches channels between the waveguides. For example, the switching matrix may allow any of the channels to be switched to the waveguide that is associated with a drop or add port of the module. Accordingly, the add/drop module need not be replaced to drop or add different channels, rather the channels need only be switched to the appropriate waveguide. This ability to automatically reconfigure the add/drop module using switching technology is in contrast to conventional add/drop modules, which tend to be fixed and are used only with specified channels/wavelengths to be dropped or added.

The module also can be configured to add a wavelength received from an input port, the add process being essentially the reverse of the drop process. Multiple add/drop modules may be used in succession. For example, an added channel may contain the data that was contained in a dropped channel or an added channel may include different data that is encoded on the same channel as a dropped channel. Of course, added channels and dropped channels may be completely unrelated as well. Those of skill in the art will recognize that many add/drop combinations are possible and none of the foregoing examples should be interpreted as limiting the scope of the invention.

The present invention may be used in a network interface associated with a computer or network device that needs data. The invention may be used to deliver, for example, Ethernet data encoded in an optical signal to a computer. The present invention also may be used with transceivers, since the dropped channel could be detected by a photodetector on the receiver module of the transceiver, the channel later converted into an electrical signal that can be used by, for example, a computer. Such a transceiver may be associated with a computer in a network that uses data, as opposed to the original bank of transceivers that generate multiple wavelengths multiplexed together to form the original, multiplexed data.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

FIGS. 1–8 depict various features and embodiments of the present invention, which is directed to a reconfigurable optical add/drop module (ROADM). The module provides the ability to dynamically add or drop various wavelengths, or channels, of an optical signal.

It should be understood, however, that the drawings are merely representations of presently preferred embodiments of the invention. Accordingly, drawings should not be construed to limit the present invention, nor should they be construed as necessarily drawn to scale.

The term "optical signal(s)" includes the full range of all electromagnetic radiation that can be used satisfactorily to communicate information through a waveguide and/or fiber optic cable. An optical device incorporating teachings of the present invention may operate on digital or analog signals in the infrared, visible and ultraviolet spectrum.

The terms "polymer" and "polymers" include any macromolecule combinations formed by the chemical union of multiple, substantially identical combining units or monomers. Certain polymers have satisfactory characteristics for use as a waveguide for optical signals. Combinations of two, three of four monomers often are referred to respectively as dimers, trimers, and tetramers. Polymers may be further classified as inorganic, organic, natural, synthetic or semi-synthetic.

The terms "hologram" and "holographic" should be interpreted broadly to encompass a wide range of arrangements, orientations, and geometries, including volume holograms. Holograms are one example of a filter that is capable of guiding, directing, focusing, and/or dispersing an optical signal. As used in this application, the term "filter" also should be interpreted broadly to encompass a wide range of structures. For example, prisms, diffraction gratings, and holograms, whether stationary or moving, may be used as types of filters. A description of one particular holographic arrangement is attached as Appendix A. While the holographic arrangement described in Appendix A points out some specific benefits for a particular holographic arrangement, nothing in Appendix A should be interpreted as limiting the types of filters that may be used in the present invention. In other words, the present invention may make use of any of the filter structures that guide, focus, or disperse light, which are discussed in Appendix A, whether described favorably or not.

Figure 1:
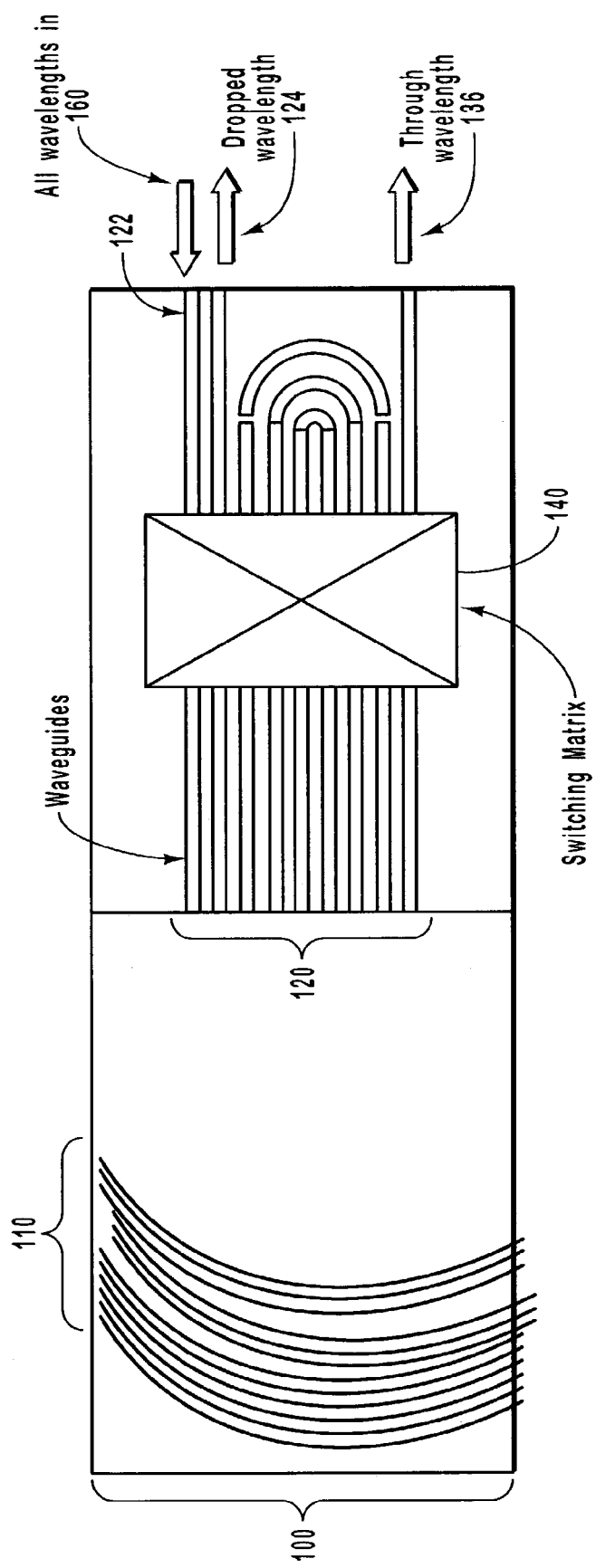
FIG. 1 illustrates a surface view of an example reconfigurable optical add/drop module in the drop configuration.

FIG. 1 presents a general, surface overview of the present invention. FIG. 1 shows a substrate 100 having holographic filters 110, waveguides 120, and switching matrix 140. An optical signal 160 enters waveguide 122 through an in port, interacts with the set of holographic filters 110, and eventually passes through switching matrix 140. The optical signal 160 may be filtered such that certain wavelengths, or channels, of the signal may travel to drop port 124, or to out port 136. While FIGS. 2–7 show the present invention in a drop configuration, it is understood that the embodiment of FIG. 1 is easily adapted for an add configuration, i.e., adding channels to the optical signal 160, shown generally in FIG. 8.

Figure 2:
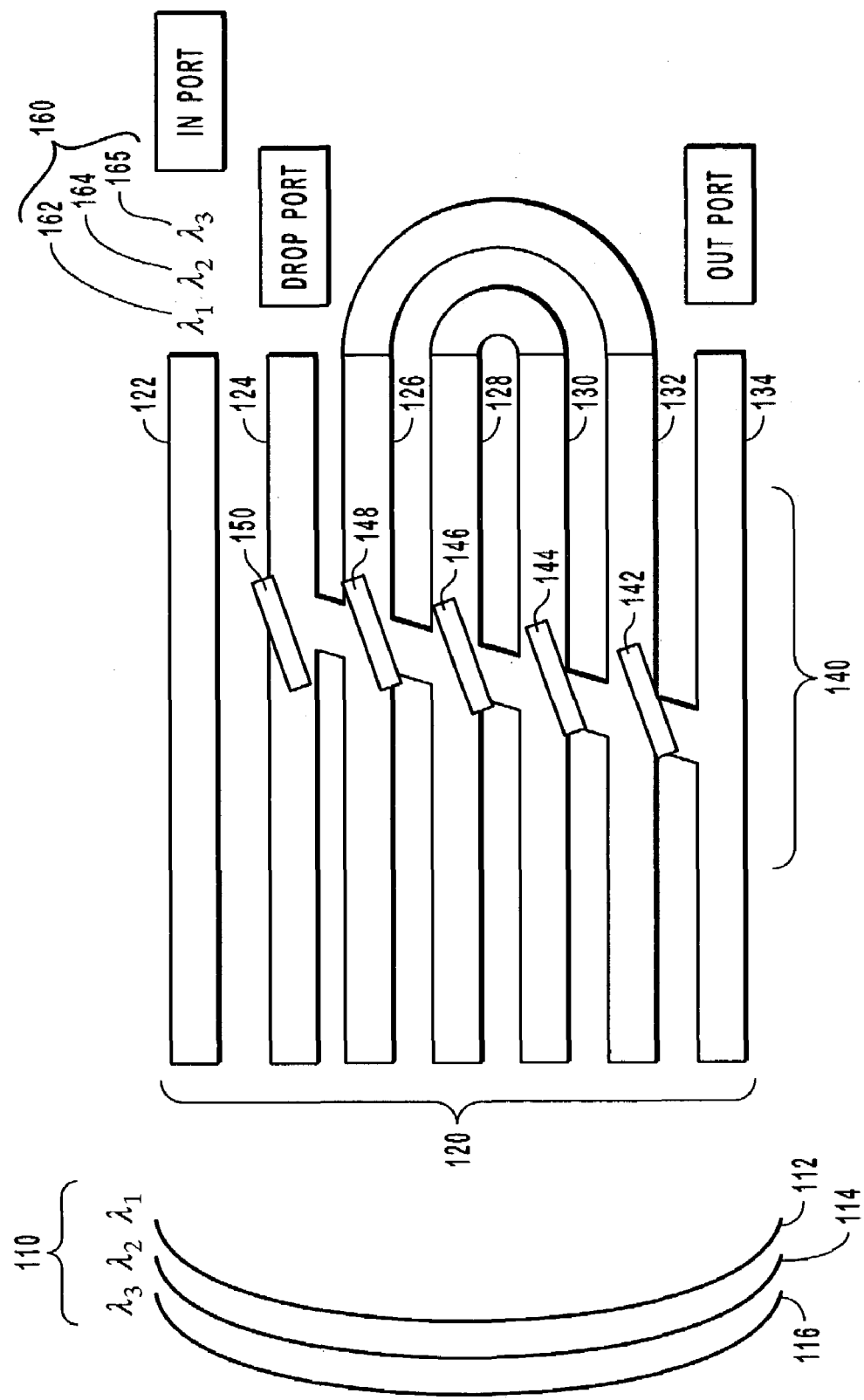
FIG. 2 illustrates an alternative surface view of an example module in the drop configuration, showing greater detail of the switching matrix.

FIG. 2 shows one example embodiment of the module 100, with an example switching matrix 140. In FIG. 2, optical signal 160 has at least three distinct channels, wavelength $\lambda_1$ 162, wavelength $\lambda_2$ 164, and wavelength $\lambda_3$ 166, when entering the waveguides 120 (individually labeled 122–134) through an in port optically coupled to waveguide 122. As used in this application, optically coupled should be interpreted broadly to encompass any type of optical transmission, direct or indirect, from one component or structure, to another. The holographic filters 110 in FIG. 2 comprise at least 3 distinct holographic filters 112, 114, and 116, corresponding respectively to channels $\lambda_1$ 162, $\lambda_2$ 164, and $\lambda_3$ 166.

The components of the switching matrix 140 may comprise thermo-optical switches that are compatible with the substrate material and consume relatively little power. For example, the switching module may comprise thermo-optical switches that operate as described in U.S. patent application Ser. No. 09/999,054, entitled "N×N Optical Switching Device Based on Thermal Optic Induced Internal Reflection Effect," filed on Nov. 1, 2001, which is incorporated herein by reference, or other switches. One benefit of thermo-optical switches, such as those described in the U.S. patent application Ser. No. 09/999,054 can be incorporated into a silicon substrate and are compatible with a substantially planar device. It is understood that other types of known, optical switching technologies can operate with this module, and should not be construed as precluded. It is also noted that each of switches 142–150 in switching matrix 140 is shown in the present diagrams as a thermo-optic switch, primarily for convenience.

In principle, a portion of a switch of appropriate composition, e.g., thermo-optic switch 148, may be electrically heated, thereby decreasing or otherwise changing its refraction index relative to the remaining switch portion. When a channel encounters the heated switch from the portion having a relatively greater (or sufficiently different) refraction index (i.e., the cooler portion), the switch reflects the channel consistent with the angle of incidence. An example switch technology is described in Appendix B.

Figure 3:
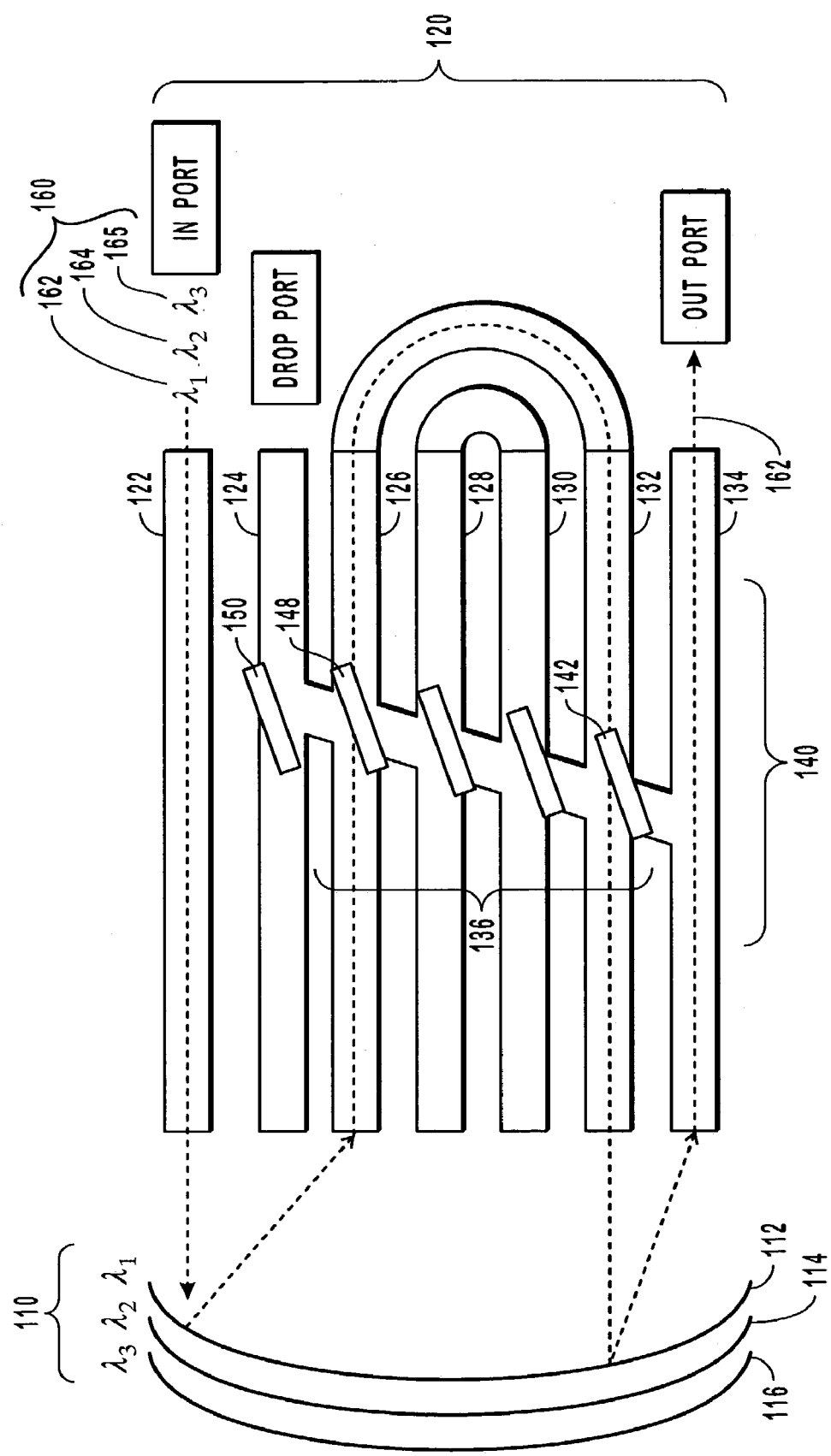
FIG. 3 illustrates an example path of a particular wavelength as it travels from an in port to an out port.

Turning now to FIG. 3, the diagram shows an example path for channel $\lambda_1$ 162 of optical signal 160. Channel 162 enters waveguides 120 through in port 122. Channel 162 is dispersed by a specific displacement channel-specific hologram 112, causing channel 162 to enter waveguide 126. In other words, hologram 112 directs channel 162 to waveguide 126. Channel 162 then passes along waveguide 126 through switch 148, since switch 148 is in the "off" configuration. By way of contrast, FIG. 3 also shows switch 150 in the "on" configuration. Because switch 148 is in the off configuration, channel 162 passes around to waveguide 132 past switch 142, exiting again toward the holographic filters 110. When channel 162 reaches channel-specific hologram 112, which reflects only channel 162 in this particular example, channel 162 is again directed by a specific displacement to waveguide 134 and the out port 134.

Figure 4:
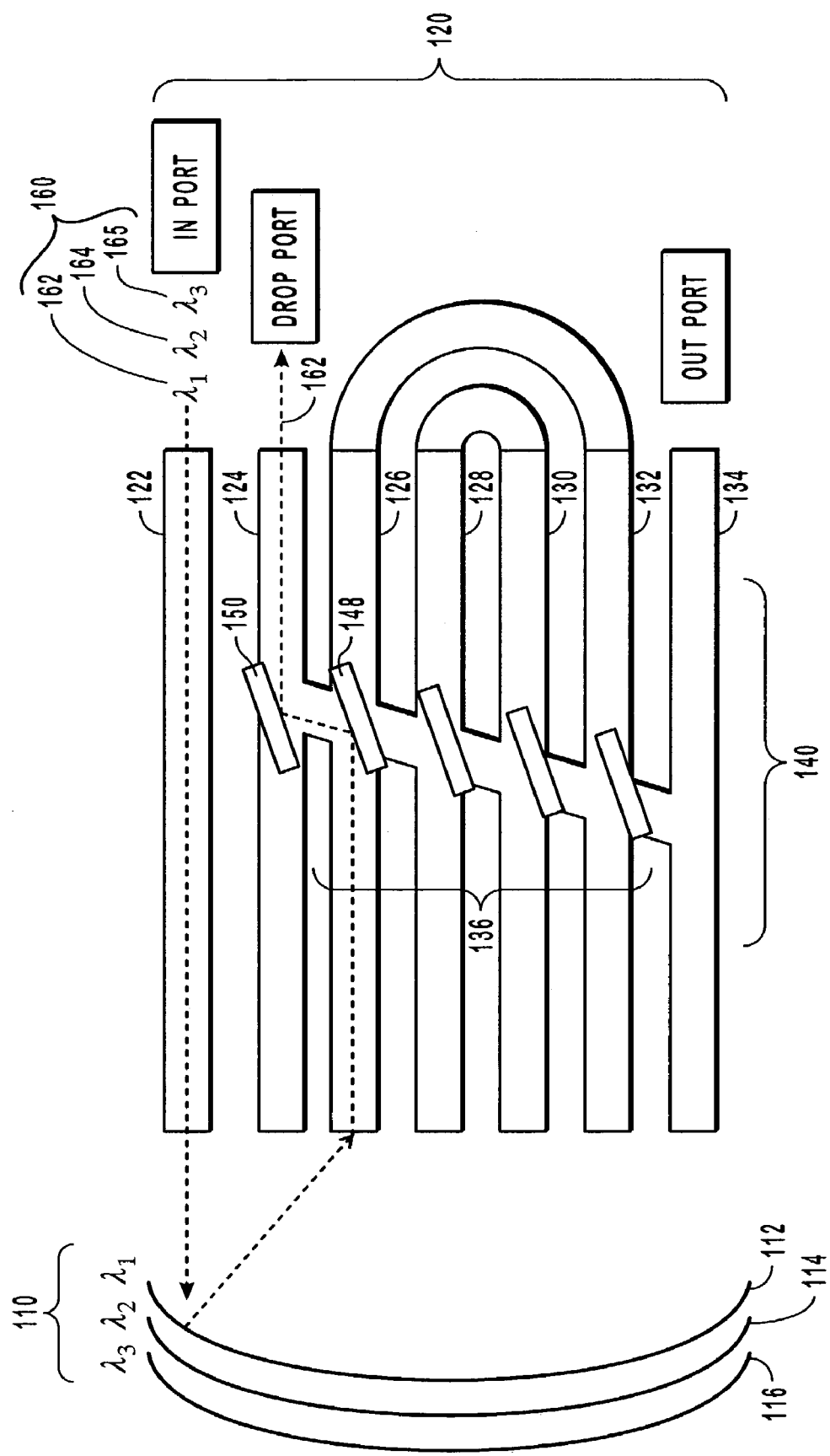
FIG. 4 illustrates an example path of a particular wavelength as it travels from an in port to a drop port.

FIG. 4 shows substantially the same situation as FIG. 3 except that in this case switch 148 is in the "on" configuration, thereby directing channel 162 through waveguide 124 to the drop port. As previously explained, activating switch 148 causes switch 148 to alter a portion of its refractive index such it becomes substantially optically reflective. Switch 148 then reflects channel 162 into the switching waveguide 136, heading toward waveguide 124. Similarly, switch 150, also in the "on" configuration, reflects channel 162 to exit along waveguide 124 to the drop port.

Thus, when switches 148 and 150 are in the "on" configuration, channel 162 is dropped from the remaining channels of the optical signal.

Figure 5:
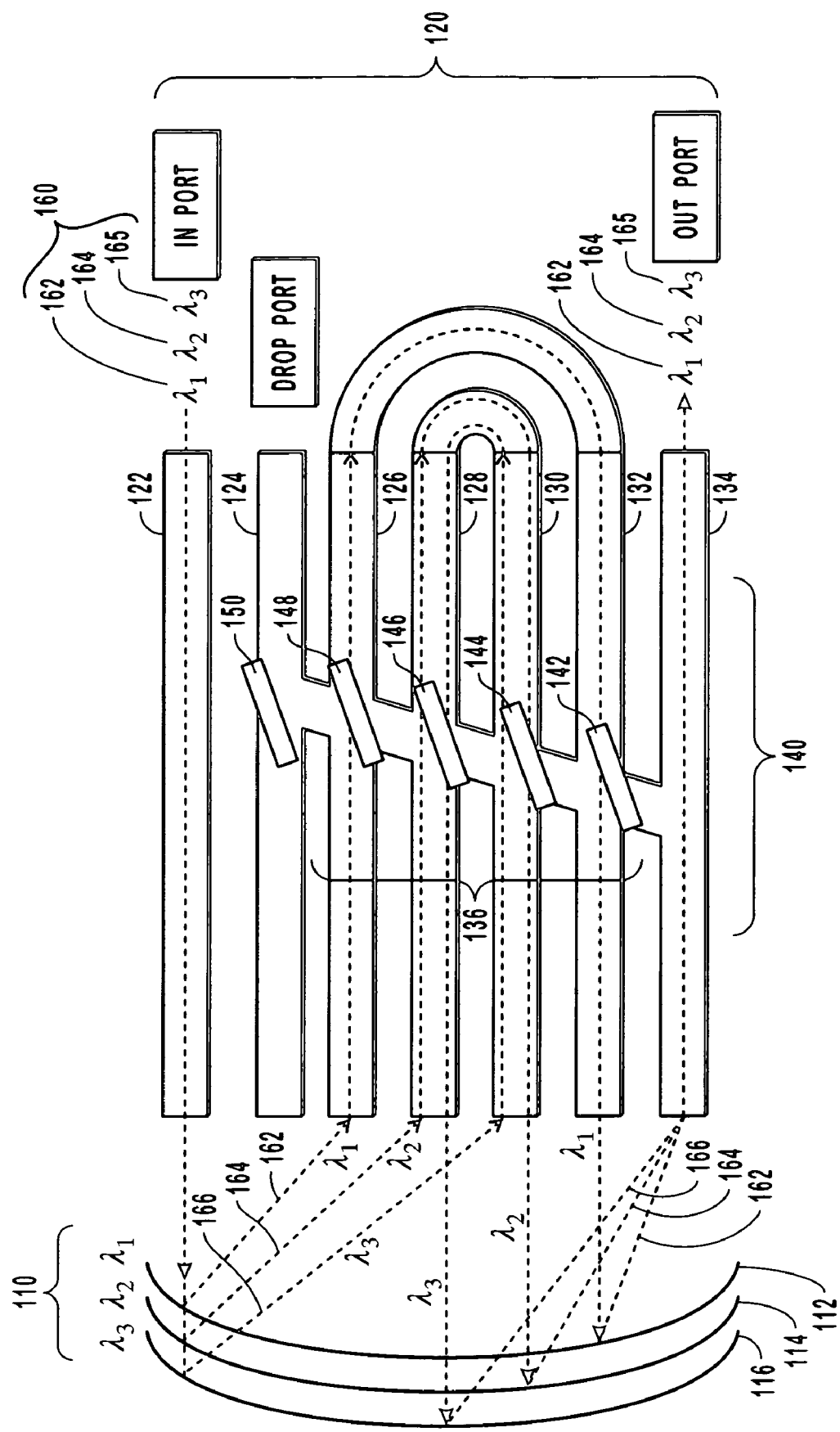
FIG. 5 illustrates example paths of several wavelengths for a particular optical signal traveling through the module from the in port to the out port.

FIG. 5 is similar to FIG. 3 except that it shows multiple channels, channels 162, 164 and 166 of optical signal 160, traveling through the module, none of which are dropped (switches 142, 144, 146, and 148 are configured "off"). As previously described, channel 162 is reflected by hologram 112 back to waveguide 126. Channel 162 then travels past switch 148 around to waveguide 132. Channel 162 travels past switch 142 and is directed by hologram 112 into waveguide 134 and the out port.

Channel 164 travels through waveguide 122, to reflect off channel-specific hologram 114. The hologram 114 directs channel 164 to waveguide 128, past switch 146, around to waveguide 130, and past switch 144. When channel 164 leaves waveguide 130, hologram 114 directs channel 130 to the out port, through waveguide 134. Channel 166 follows a similar scenario as channels 162 and 164 except that hologram 116 reflects channel 166 to waveguide 130, past switch 144 around to waveguide 128, again to hologram 116, and finally to the out port, through waveguide 134.

Figure 6:
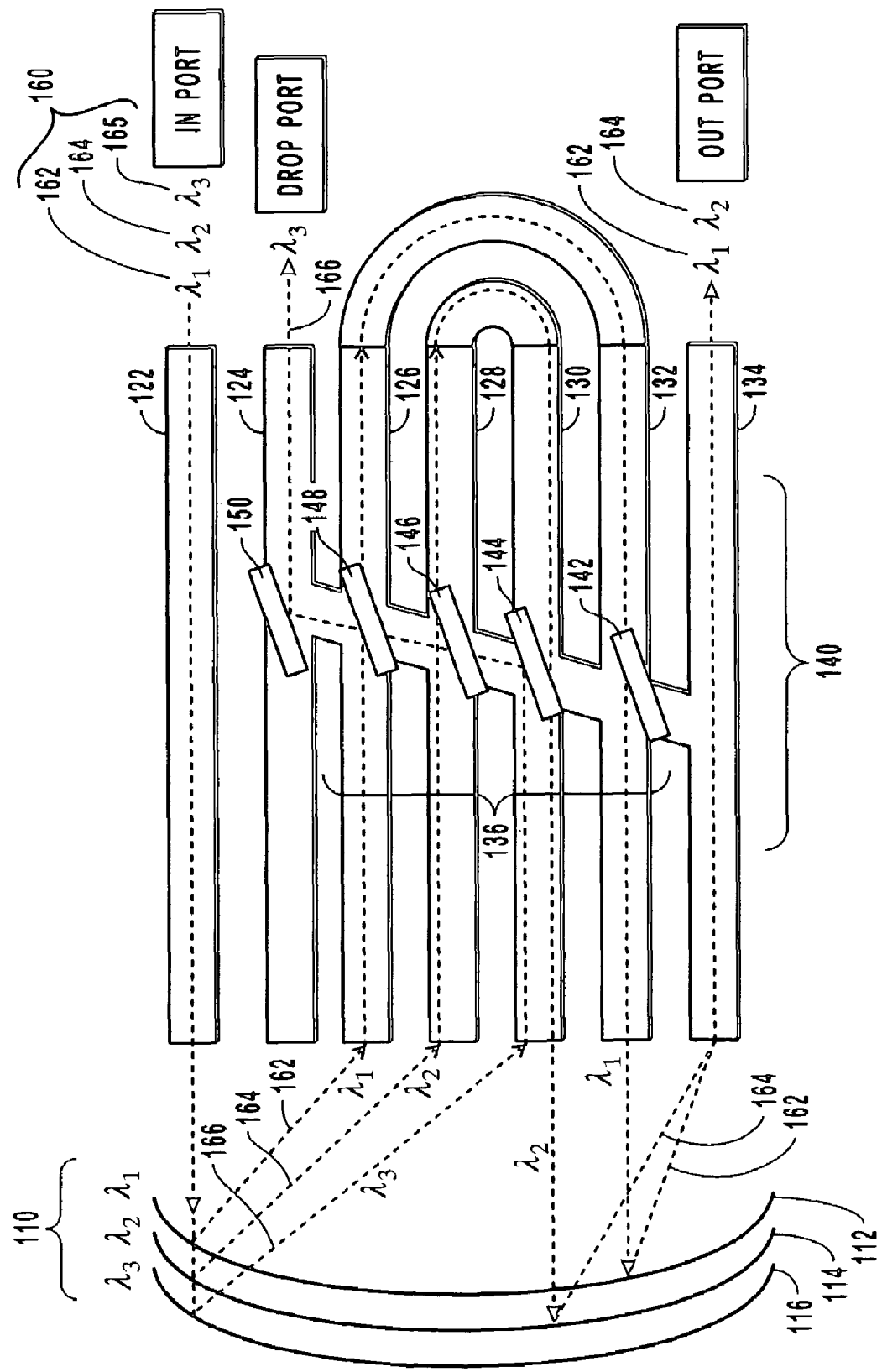
FIG. 6 illustrates example paths of several wavelengths for a particular optical signal traveling through a module from the in port to the out port, with one wavelength being directed to the drop port.

FIG. 6 shows an embodiment of the add/drop module in the drop configuration where channel $\lambda_3$ 166 is to be dropped from the signal 160. Here, the channel paths are substantially the same as in FIG. 5, but since switch 144 is in the "on" configuration, channel 166 travels along the switching waveguide 136 past each of the switches 146 and 148 (whether each switch is in the on or off configuration). Ultimately, switch 150 (switched on) reflects channel 166 along waveguide 124 to the drop port.

Figure 7:
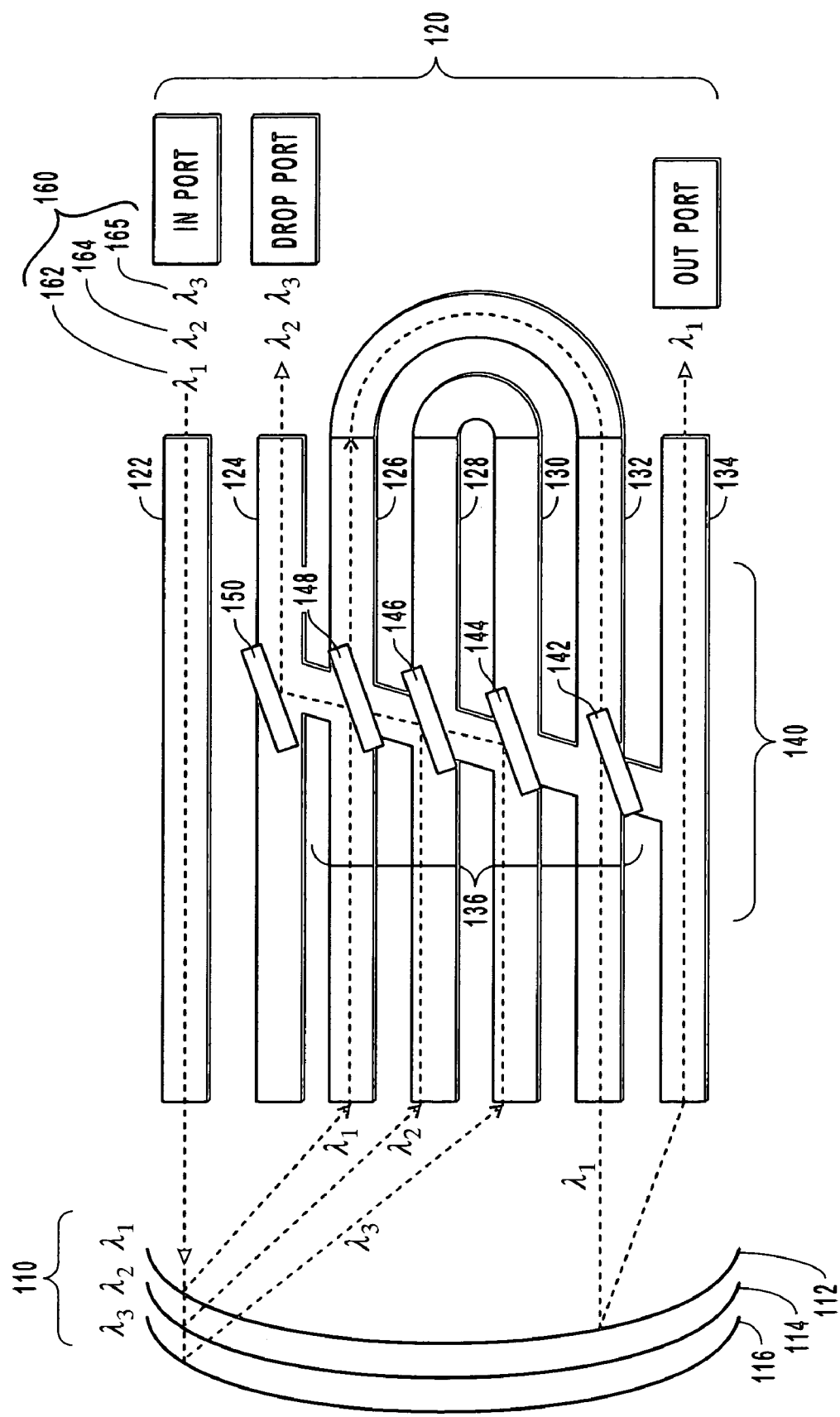
FIG. 7 illustrates example paths of several wavelengths for a particular optical signal traveling through an example module from the in port to the out port, with multiple wavelengths being directed to the drop port.

It should be understood that the present add/drop module's configuration may be used to drop (or add) a plurality of channels from an optical signal 160, as shown in FIG. 7. FIG. 7 shows the paths of channels 162, 164, and 166 when the switches 144, 146, and 150 are configured as on. Channel 162 follows the same paths as previously described, ultimately exiting to the out port, through waveguide 134. Channel 166 follows the same path to the drop port through waveguide 124; note, however, that channel 166 passes through switch 146 from the opposite direction even though switch 146 is in the on configuration.

Channel 164 in FIG. 7 follows the same initial path as in FIG. 6, except that since switch 146 is configured as on, switch 146 reflects channel 164 along switching waveguide 136. Then, since switch 150 is configured as on, switch 150 reflects channel 164 through waveguide 124 to the drop port. Thus, in this embodiment, at least two channels are dropped from the optical signal.

Figure 8:
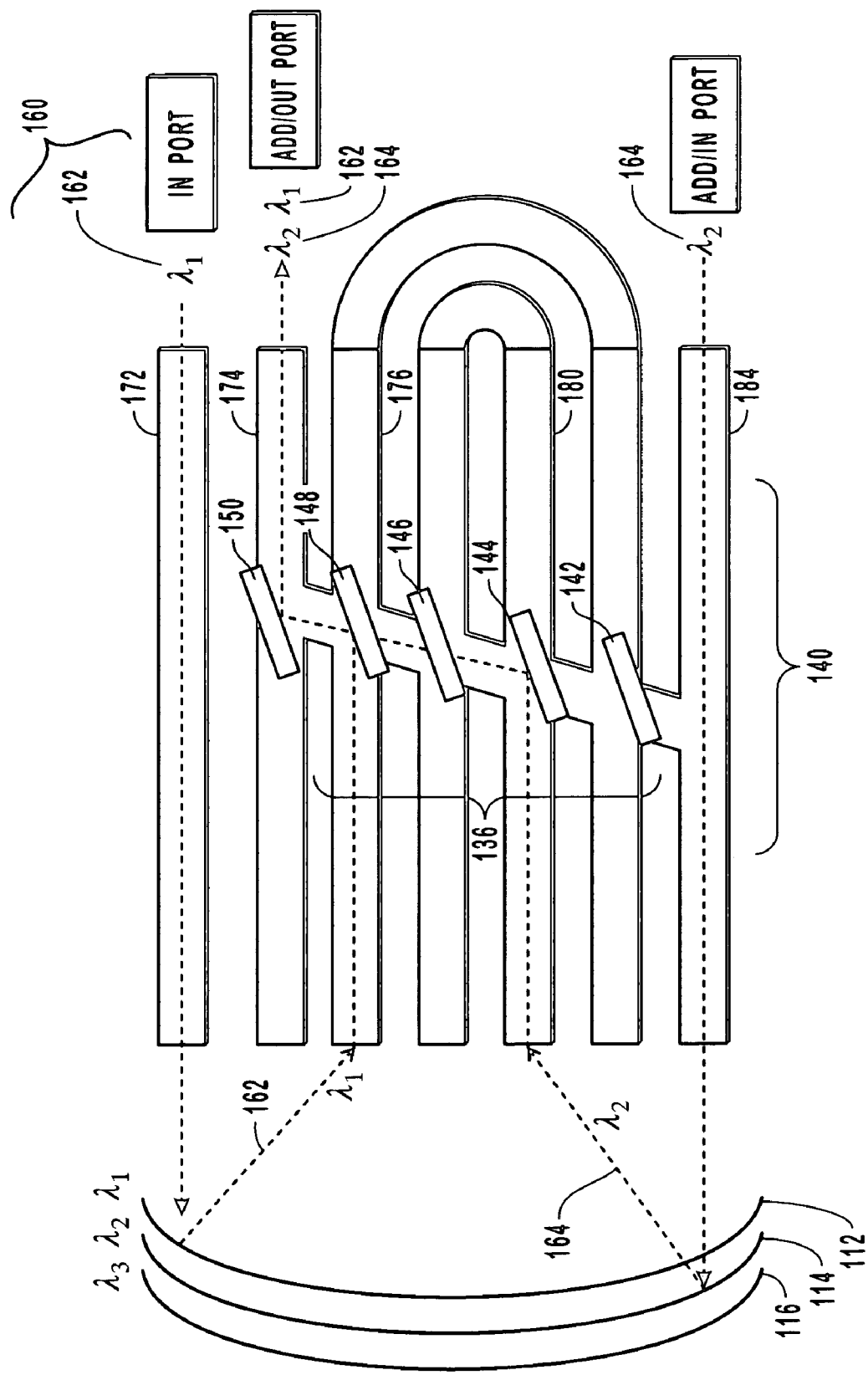
FIG. 8 illustrates example paths of several wavelengths through an example module in the add configuration, with two wavelengths being combined.

The prior figures show the module 100 in a drop configuration. However, the module is also suitable for an add configuration, essentially the reverse of a drop configuration. To illustrate, FIG. 8 shows one embodiment of the instant invention in an add configuration. Here, wavelength $\lambda_2$ 164 is added to an optical signal comprising wavelength $\lambda_1$ 162.

In FIG. 8, optical signal 160, comprising channel $\lambda_1$ 162, enters the add/drop module 100 from the in port through waveguide 172. A channel $\lambda_2$ 164 to be added with channel $\lambda_1$ 162 enters through add/in port waveguide 184. Channel 162 travels along waveguide 172 until it reaches channel-specific hologram 112. Hologram 112 directs channel 162 into waveguide 176. Since switch 148 is configured as on, channel 162 travels along switching waveguide 136 to switch 150, also configured as on. Switch 150 then reflects channel 162 out along the waveguide 174 to the add/out port.

Channel 164 enters though waveguide 184 and interfaces with channel-specific hologram 114. Hologram 114 reflects channel 164 into waveguide 180, where channel 164 travels to switch 144. Since switch 144 is configured as on, switch 144 reflects channel 164 along switching waveguide 136 toward switch 150. Passing switches 146 and 148, channel 164 joins channel 162 prior to interfacing with switch 150, also configured as on. As switch 150 reflects both channels 162 and 164 along waveguide 174 to the add/out port, channel 164 is added to the optical signal comprising channel 162.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. An add/drop module configurable for dynamically adding or dropping one or more wavelengths of an optical signal in an optical network without having to physically replace the module with a fixed, wavelength-specific module, the add/drop module comprising:
   a substrate;
   a plurality of waveguides on said substrate guiding at least one wavelength of an optical signal;
   one or more ports optically connected with at least one of said waveguides;
   a configurable switching matrix, said configurable switching matrix dynamically directing specific wavelengths of said optical signal along said waveguides to one or more of said ports; and
   a plurality of wavelength-specific holographic filters external to the configurable switching matrix, each of said holographic filters optically coupled to a port and optically coupled to the configurable switching matrix.

2. The module of claim 1, wherein said one or more ports include at least an in port and an out port.

3. The module of claim 2, wherein said one or more ports include at least one of a drop port and an add port.

4. The module of claim 1 wherein said holographic filters direct specified wavelengths from one waveguide to another based on the geometric orientation of said filters.

5. The module of claim 1 wherein said filters are formed in a volume hologram.

6. The module of claim 1, wherein said configurable switching matrix is reversible and comprises at least one switch that directs a wavelength of said signal based on the refractive index of said switch.

7. The module of claim 6, wherein said switch comprises a thermo-optic material.

8. The module of claim 1, wherein said substrate is a photopolymer.

9. The module of claim 8, wherein said waveguides are etched onto said substrate.

10. The module of claim 1, further comprising at least one successive add/drop module in series.

11. A method for dynamically dropping one or more wavelengths from an optical signal in an optical network without physically replacing a wavelength-specific add/drop module, the method comprising acts of:
   receiving an optical signal along at least one of a plurality of waveguides;
   directing the optical signal to a holographic filter;
   holographically directing at least a portion of said optical signal to a switching matrix;
   dynamically switching one or more specific waveguides within the switching matrix to direct said portion along one or more alternate waveguides;
   directing the optical signal to the holographic filter a second time;
   holographically directing one or more remaining portions of said optical signal to the switching matrix; and
   combining the one or more remaining portions of said optical signal within the switching matrix.

12. The method of claim 11, wherein said one or more alterative waveguides guide said at least a portion of said optical signal to a drop port.

13. The method of claim 12 further comprising placing an add module in series with the module configured to drop one or more wavelengths.

14. The method of claim 11, wherein dynamically switching said waveguide path further comprises manipulating a thermo-optical switch to alter the refractive index of said switch.

15. The method of claim 11, wherein receiving said optical signal further comprises receiving said signal through an in port.

16. The method of claim 11, wherein combining the one or more remaining portions of said optical signal further comprises directing the combined remaining portions to an out port.

17. A method for dynamically adding one or more portions to an optical signal in an optical network without physically replacing a portion-specific add/drop module, the method comprising acts:
   receiving a plurality of optical signals, each along at least one of a plurality of waveguides;
   external to a optical switching matrix:
      holographically directing at least a portion of each of said received optical signals to one or more portion-specific waveguides of the optical switching matrix;
   within the optical switching matrix:
      dynamically switching at least one portion-specific waveguide to direct at least one portion of said received optical signals to one or more alternate waveguides; and
      combining said at least one portion of said received optical signals from said one or more alternate waveguides with at least another portion of said received optical signals from said one or more portion specific waveguides.

18. The method of claim 17, wherein said one or more alternative waveguides guide said at least one portion of said received optical signals from an add port.

19. The method of claim 18 further comprising placing a drop module in series with the module configured to add one or more portions.

20. The method of claim 17, wherein dynamically switching said waveguide path further comprises manipulating a thermo-optical switch to alter the refractive index of said switch.

21. The method of claim 17, wherein receiving a plurality of optical signals comprises receiving at least one of said signals through an in port.

22. The method of claim 21, wherein receiving a plurality of optical signals comprises receiving at least one of said signals through an add port.

23. The method of claim 22, further comprising directing the combined portions to an output port.

* * * * *